May 9, 1961 W. E. THORNTON 2,983,915
SCORING SYSTEM
Filed April 1, 1957 5 Sheets-Sheet 1

INVENTOR:
William E. Thornton
By Smyth & Roston
Attorneys

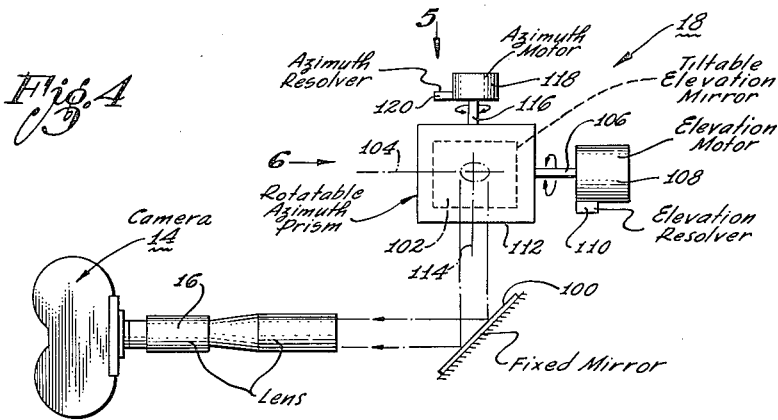
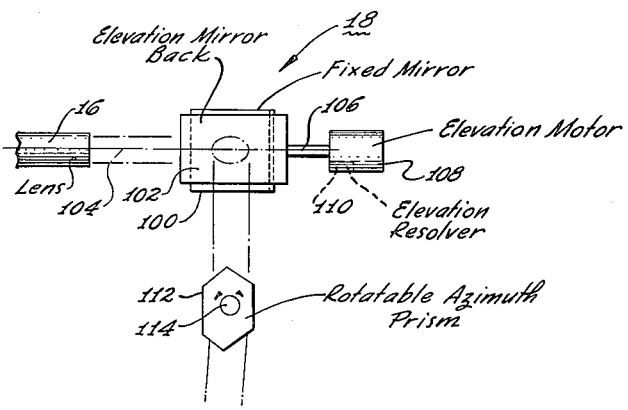
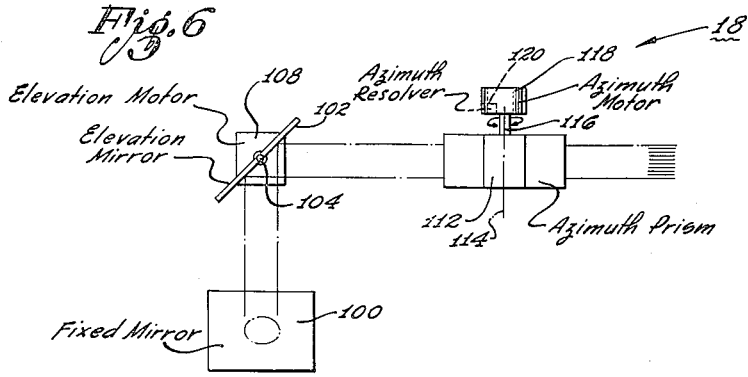

May 9, 1961  W. E. THORNTON  2,983,915
SCORING SYSTEM

Filed April 1, 1957  5 Sheets-Sheet 3

INVENTOR:
William E. Thornton
By Smyth & Roston
Attorneys

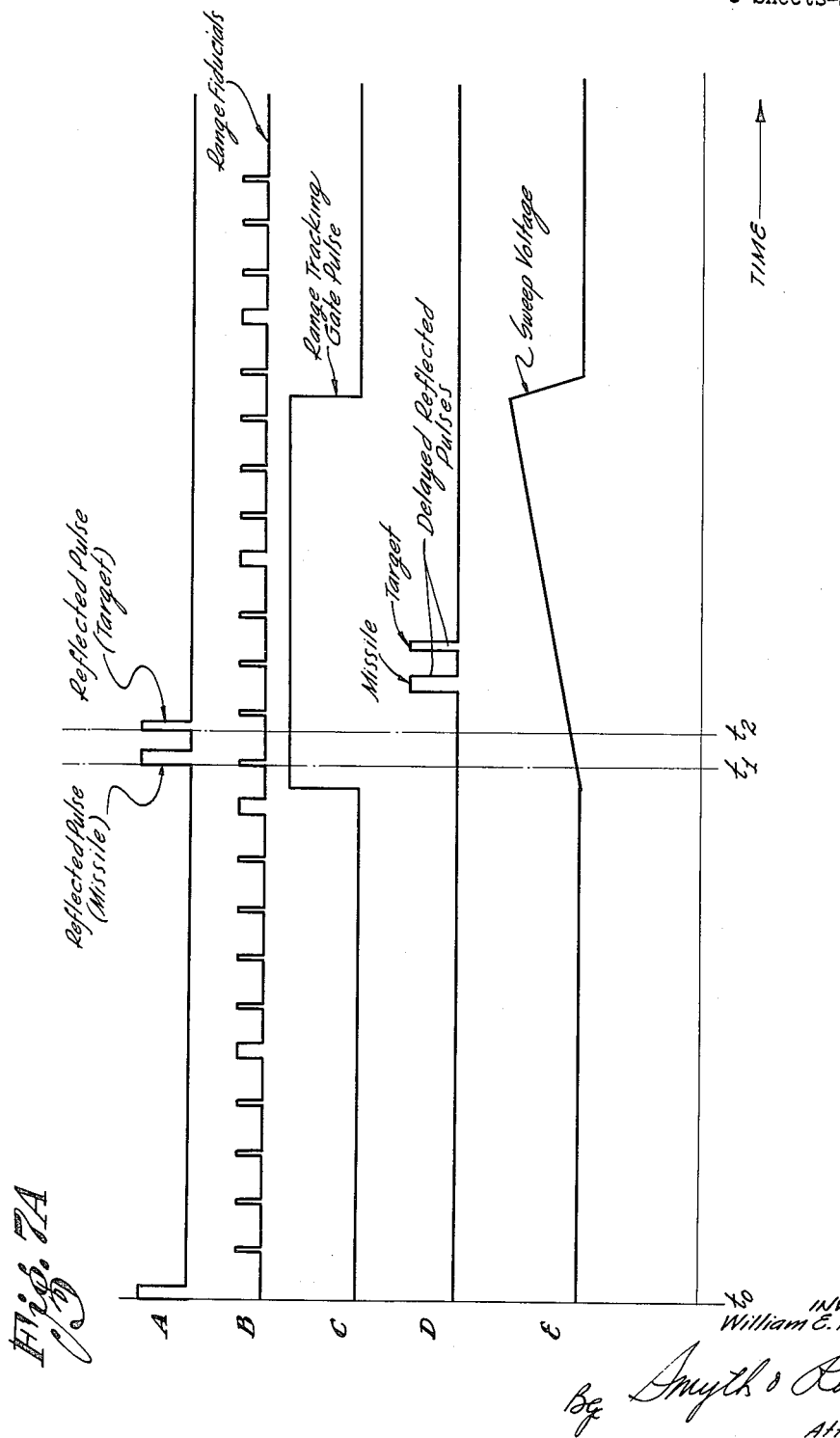

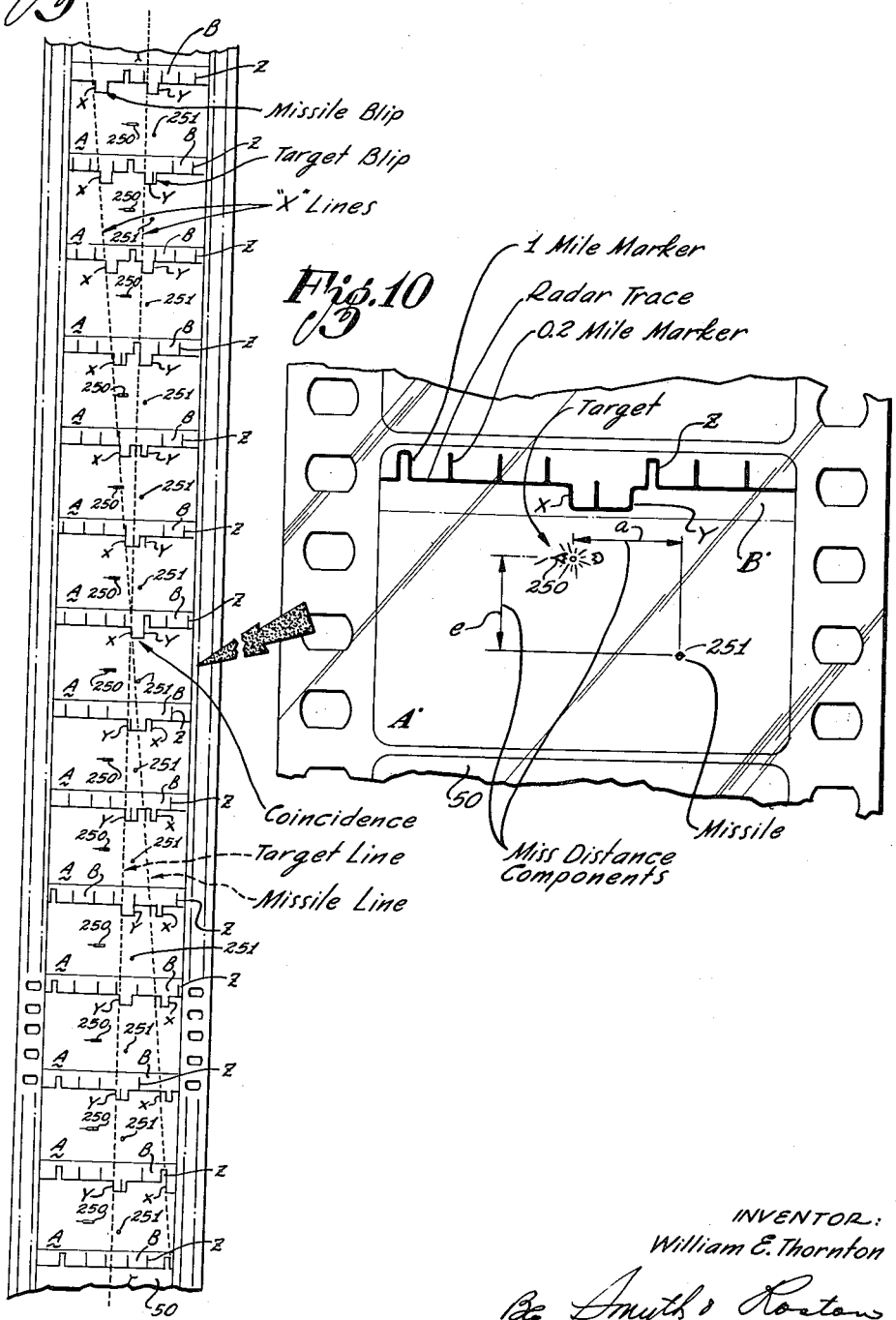

United States Patent Office 2,983,915
Patented May 9, 1961

2,983,915
SCORING SYSTEM
William E. Thornton, Los Angeles, Calif., assignor to Del Mar Engineering Laboratories, Los Angeles, Calif., a corporation
Filed Apr. 1, 1957, Ser. No. 649,769
18 Claims. (Cl. 343—5)

This invention relates to systems for recording data pertaining to missiles in flight. More particular the invention is concerned with a scoring system for measuring the miss distance between a missile and an airborne target, which system utilizes radar and optical principles to measure such miss distances.

Scoring systems of the general type with which the present invention is concerned find utility for providing information concerning the operation of the fire control system of an aircraft under simulated operational conditions. This enables the fire control system to be adjusted for optimum accuracy.

This general type of scoring system also finds utility in training programs; in determining the potentialities of different types of aircraft and their firing equipment; and in providing data concerning the effectiveness of different types of missiles and their behavior. The scoring system of the invention is also useful in combat for providing a record of actual kills.

Copending application Ser. No. 610,140 which was filed September 17, 1956, for the present inventor, now Patent No. 2,938,201, discloses a scoring system of the type discussed in the preceding paragraphs and which is useful for the purposes outlined above. The scorer disclosed in the copending application combines radar and optical principles for assimilating the necessary information to determine the miss distance between an airborne target and missiles fired at the target. In the scorer described in the copending case, a motion picture camera is mounted in an attacking aircraft and information from the aircraft radar or from an additional radar unit is correlated with the optical images to provide the desired information.

In brief, the system described in the copending application obtains two of the required three spatial positions of the target and missile from the film of a motion picture camera. The third coordinate is obtained by tracking the missile with radar, and this latter coordinate is displayed on the photofilm along with the optical record. The optical frame in which the radar indications show a coincidence between the photoplanes of the missile and target is used to measure the miss distance.

The only characteristic which a target suitable for use with the invention need exhibit is that it be radar reflective and visible. Suitable radar reflectors for inclusion in airborne targets are known. For example, a radar reflector which is in present day general use consists of an 8-corner, distorted angle, bistatic reflector designed to have sufficient monostatic capability for satisfactory target acquisition, and to have sufficient bistatic capability for attack by guided missiles.

The visibility of the target may be augmented by the provision of suitable flares in the target. This is a known expedient. The flares, for example, may be fired sequentially to provide an illuminated target over an appreciable time interval. Flares are presently known which are capable of radiating 6 kilowatts of energy, and such flares are suitable for the present purpose. The target may also include a source of infra-red radiation. The target images may, therefore, be recorded on the film strip with sufficient intensity to enable accurate measurements to be made.

As pointed out in the copending application, scoring systems of the type described above are not only useful for indicating and measuring the miss distances and targets. Such systems may also be used to yield large amounts of information including dispersion and ballistic data of the missiles.

The system described in the copending application utilized a fixed camera with a relatively short focal length and with a relatively large field of view. This system operated satisfactorily where the firing range was relatively short. However, the system required an accurate maneuvering of the attack aircraft in order that the camera would be held trained on the target area.

For relatively long firing ranges, a long focal length of the camera is required so that the target area may be properly focused on the film strip, and the field of coverage of the camera is necessarily limited. It has proved difficult to maneuver the aircraft for such relatively long firing ranges in such a manner that the fixed camera in the aircraft is held aimed at the target area.

The scoring system of the present invention is especially applicable to long range firing, and it eliminates the need for precise maneuvering of the attacking aircraft. The present system provides for the optical system of the camera to be slaved to the radar antenna of the aircraft, which antenna is tracked on the target. With such a system, the pilot need only fly the aircraft within an envelope determined by the scanning limits of the radar antenna. So long as the pilot maintains the aircraft within this envelope, the camera will be held effectively trained on the target.

Another problem that has arisen at the longer ranges is that of accurately measuring the miss distance from the images on the film presentation. One method suggested in the copending application is to use stadiametric means, that is, to compare the distance between the missile and target images with the size of the target image, the latter image representing a target of known dimensions. At the longer ranges, however, even a long focal length lens does not provide a target of image size of sufficient resolution to enable the stadiametric method to be used. It is desirable therefore that absolute target ranges be presented on the film. This may conveniently be achieved by the use of fiducial range markings, as also suggested in the copending application.

In the drawings:
Figure 1 shows the scoring system of the present invention mounted beneath and permanently attached to the top access panel of a fighter aircraft just forward of the front pressure bulkhead;

Figures 4, 5 and 6 are somewhat schematic views from different angles of a controllable optical system which, in accordance with the invention, is positioned in the optical path of the camera of Figures 4 and 5 and which is controllable to change the direction of the optical axis of the camera effectively to maintain the camera trained on the target with which the system is used;

Figure 7A is a series of curves useful in explaining the operation of the system of Figure 7;

Figure 9 is a composite film strip bearing visual or optical information of the target area and also bearing radar indicated distance and range information concerning the target and missiles fired at the target; and Figure 10 shows a selected frame from the film strip of Figure 9 and corresponding to the coincidence of the optical planes of the target and the missiles and illustrating how the miss distances between the missiles and the target can be determined from measurements obtained from that frame.

Figure 1:
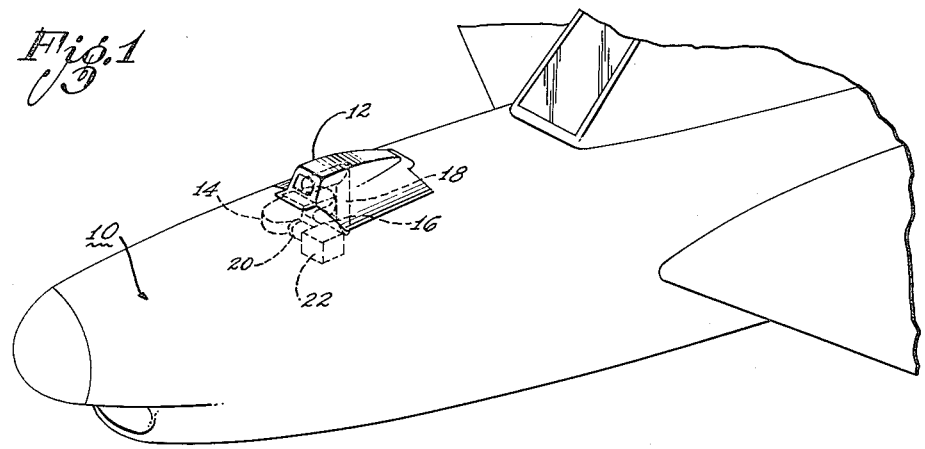

Figure 1 illustrates a present-day fighter aircraft which is designated as 10, and which may be of the type presently referred to as an F-89H. As noted previously, such an aircraft includes an access panel 12 which is mounted on the top of the body just forward of the front pressure bulkhead. The equipment of the invention may be mounted on the underside of this panel, and such installation of the equipment does not impair the accessibility of other aircraft accessories. Also, this installation permits an efficient installation procedure because the equipment may be mounted on access panels remote from the aircraft, and then installed in the aircraft in a single operation. This speeds up the installation process and does not result in expensive aircraft being placed out of service for any considerable length of time.

As shown in Figure 1, the system of the invention includes a motion picture camera 14 having a lens system 16 protruding from one side. A controllable optical system 18 is disposed in the optical path of the camera, and this optical system includes reflective elements which are pivotable to control the direction of the optical axis of the camera. The purpose of these elements is to effectively hold the camera trained on the target, as will be described.

The system also includes a cathode-ray tube 20 which is supported adjacent the camera and which is radar controlled to provide a dual record on the film strip in the camera. More details of this will be discussed subsequently. An electronic control unit 22 is also included in the apparatus, and this control unit includes the various electronic controls of the system.

The equipment of the invention is mounted on a single chassis for quick installation and removal, and a constructed embodiment has been found to weigh less than thirty pounds. The equipment derives its camera power from the usual aircraft power source, and it obtains its exciting voltages from the fire control system of the aircraft.

Figure 2:
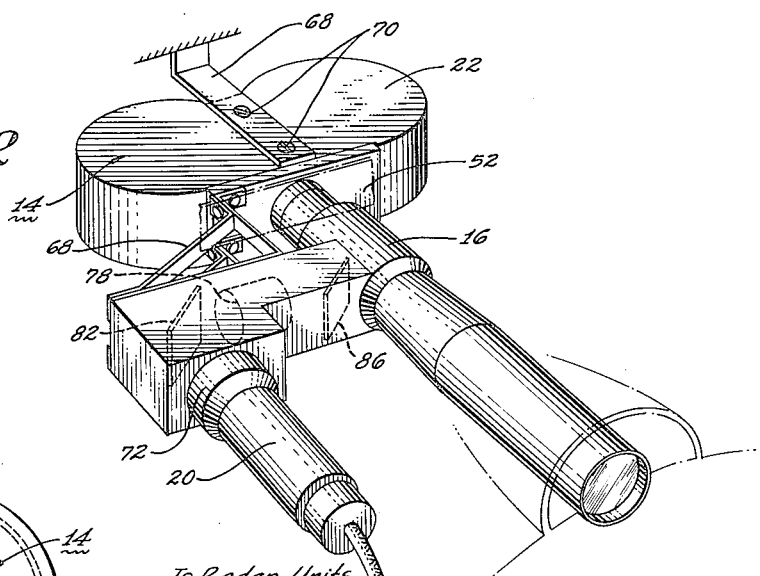
Figure 2 is a perspective view of a camera and cathode-ray tube assembly and a combining lens system, the illustrated elements being utilized to provide a dual film record in accordance with the invention.
Figure 3:
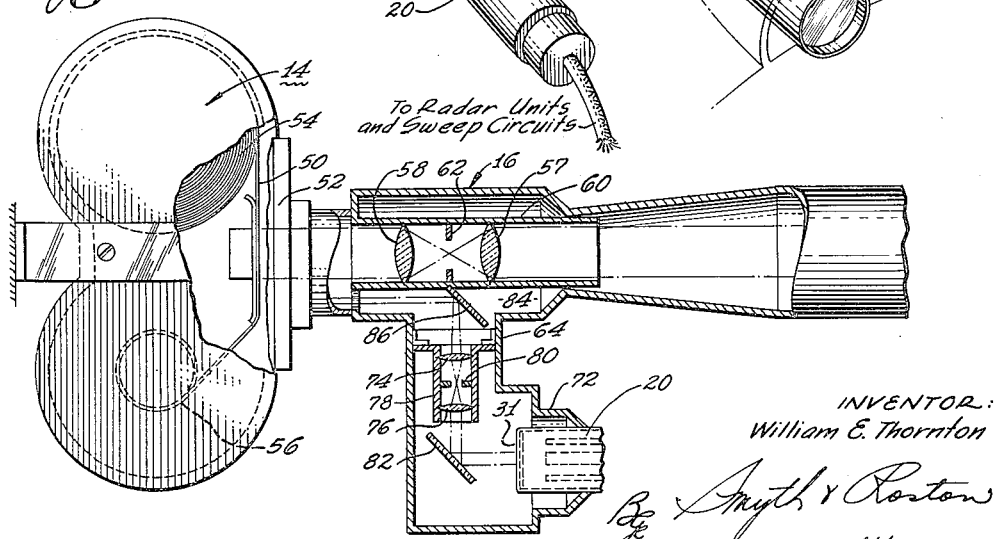
Figure 3 is a side elevational view, partly in section, of the combining lens system of Figure 2 which is used to provide the dual film record referred to above.

The camera 14 may be a usual 28-volt 35-millimeter camera which operates at 24 frames a second. Figures 2 and 3 show the mechanical details of the camera 14 and of the mounting for the cathode-ray tube 20, and these figures also show the details of the lens system 16. The camera may be actuated by any suitable and conventional electrical drive mechanism, and it operates in known manner to draw a film strip 50 in an intermittent manner from a reel 54 past a conventional shutter assembly 52 to a reel 56.

The lens system 16 includes a first section which constitutes a normal objective lens for the camera. This first section may include, for example, a pair of convex lenses 57 and 58. These lenses are mounted in a usual lens barrel 60, and they are axially spaced along the barrel. The lenses 57 and 58 are constructed to focus optical images on the film strip 50 in successive optical image frames along the strip. A usual apertured stop 62 is positioned between the lenses 57 and 58 in the lens barrel. The relative aperture of the first section of the lens 16 may, for example be $f/5.6$, and this section may be a 10-inch lens. The optical images introduced to the film strip of the system are represented, for example, by the image frames A in Figure 9.

The lens system 16 also includes a second section for directing images of the radar indications to the film strip 50. The radar indications appear as luminous vertical lines or "blips" on the screen 31 of the cathode-ray tube 20, and images of these spots are directed to the film strip in correlation with the optical image frames A.

The second section of the lens system 16 is mounted in a housing 64. This housing is supported on the frame of the camera 22 by means of a bracket 66 (Figure 4). The entire asesmbly may be supported on the underside of the access panel 12 of Figure 1 by means, for example, of a supporting arm 68. This arm is secured to the camera casing by means of screws 70. The housing 64 also serves to support the cathode-ray tube 20, and this is accomplished by means of a mounting collar 72. This collar surrounds the cathode-ray tube adjacent its display screen 31 so that the display screen extends into the housing.

The second lens section includes a pair of convex lenses 74 and 76 which are mounted in a lens barrel 78. The lens barrel 78, in turn, is supported within the housing 64 in any suitable manner. The two lenses 74 and 76 are spaced axially within the lens barrel 78 along an optical axis which is essentially perpendicular to the optical axis of the first section of the lens system 16. An apertured stop 80 is included in the lens barrel 78 between the lenses 74 and 76.

The cathode-ray tube 20 is mounted on an axis essentially parallel to the optical axis of the first section of the lens system 24, and the tube is positioned with its screen 31 facing the rear of the camera 14. A mirror 82 is mounted within the housing 64. This mirror is positioned to direct images of the radar indications on the screen 31 of the cathode-ray tube 20 along the optical axis of the second section of the lens system 16. These images are directed through the lenses 74 and 76 and through the apertured stop 80 into the compartment 84. The compartment 84 is adjacent the lens barrel 60 of the first section of the lens system 16.

A second mirror 86 is mounted in the compartment 84. This second mirror is positioned to direct the images from the lens 74 along a path parallel to the optical axis of the first lens section. The second section of the lens system 16 serves to focus on the film strip 50 images of the indications appearing on the screen 31 of the cathode-ray tube. These latter images appear in a display across the full width of the top of each frame of the film strip 50, and they occupy a masked area of approximately 20 percent of the frame height.

The apertured stop 80 is adjusted so that the second lens section has a relative aperture of, for example, $f/3.5$. The second lens section produces, as noted above, transverse image frames extending across the top of each optical frame A of the film strip, these latter areas being designated as B in Figure 9. In this manner, the film strip 50 carries a continuous record in successive optical image frames of the area to which the camera is directed, and the film strip also carries a correlated continuous record in successive transverse frames of the radar indications appearing on the screen 31 of the cathode-ray tube 20.

In the equipment described in copending application Serial No. 610,140 referred to above, and as noted previously in the present specification, the camera and its associated optical system were mounted in a fixed position in attacking aircraft, so that the aircraft itself had to be maneuvered to maintain the target area in the field of view of the camera. In the present invention, the camera itself is fixedly mounted in the aircraft. However, an adjustable optical system 18 is included in the optical path of the camera. This optical system effectively provides that the camera may be directed onto the target area independently of the actual maneuvering of the aircraft. The optical system 18 is illustrated in Figures 4, 5 and 6.

As shown in Figure 1, the camera 14 is mounted on its side, and its optical axis must first be changed by 90° to extend it upwardly with respect to the aircraft. This is accomplished by a fixed reflector or mirror 100 which is mounted in the optical system. This mirror 100, as illustrated most clearly in Figure 4, intercepts downwardly extending light rays and changes the direction of these rays by 90° and directs them into the lens 16 of the camera.

The controllable optical system 18 also includes a reflector or mirror 102 which is pivotally mounted about an axis 104 and which shall be termed the elevation mirror. The elevation mirror is tiltable to control the direction of the optical axis to the camera 14 through an elevation range of from −5° to +20°. The elevation mirror is keyed to a shaft 106 which extends along the pivot axis 104. The shaft 106 is controlled by a servomotor 108, and this motor has a resolver 110 associated with it. The resolver 110 is of known construction, and it develops an analog signal which is a function of the angular position of the shaft 106.

The elevation mirror 102 may be considered a first beam-shifting means, and it directs the light rays from the target area to the fixed mirror 100 which then directs them to the lens 16 of the camera 14.

A second beam-shifting means is also disposed in the optical path of the camera 14, and this second beam-shifting means may conveniently take the form of a prism 112 which is rotatable on an axis 114, the axis 114 being disposed at an angle of 90° to the pivotal axis 104 of the reflector 102. The prism 112 is constructed in accordance with known optical principles, to cause the light rays emitted from it to emerge at an angle to the incident light rays which is a function of the angular position of the prism itself. The prism is tilted through an angular range by a shaft 116 which extends along the axis 114 and which is driven by a servomotor 118. The servomotor 118 has a resolver 120 associated with it and which may be similar to the resolver 110 associated with the elevation motor 108.

As best shown in Figure 6, the prism 112 has a sufficient width so that the tilting of the elevation reflector or mirror 102 throughout its range will not result in the beam being directed out of the range of the prism. The motor 118 rotates the prism 112 to change the direction of the optical axis from the camera 14 through an azimuth range of, for example, from +20° to −20°. Therefore, by the appropriate control of the motors 108 and 118, the direction of the optical axis of the camera 14 and the lens 16 can be changed through a scanning cone of the limits, for example, as noted above. The motors 108 and 118 are controlled in a manner to be described, so that the camera 14 is held effectively trained on the target area, even though the aircraft itself may be maneuvered away from that direction. The only limitation is that the aircraft maintain its direction to a sufficient extent so that the target area will remain within the limits of the cone of scanning provided by the control of the reflector 102 and of the prism 112.

Figure 7:
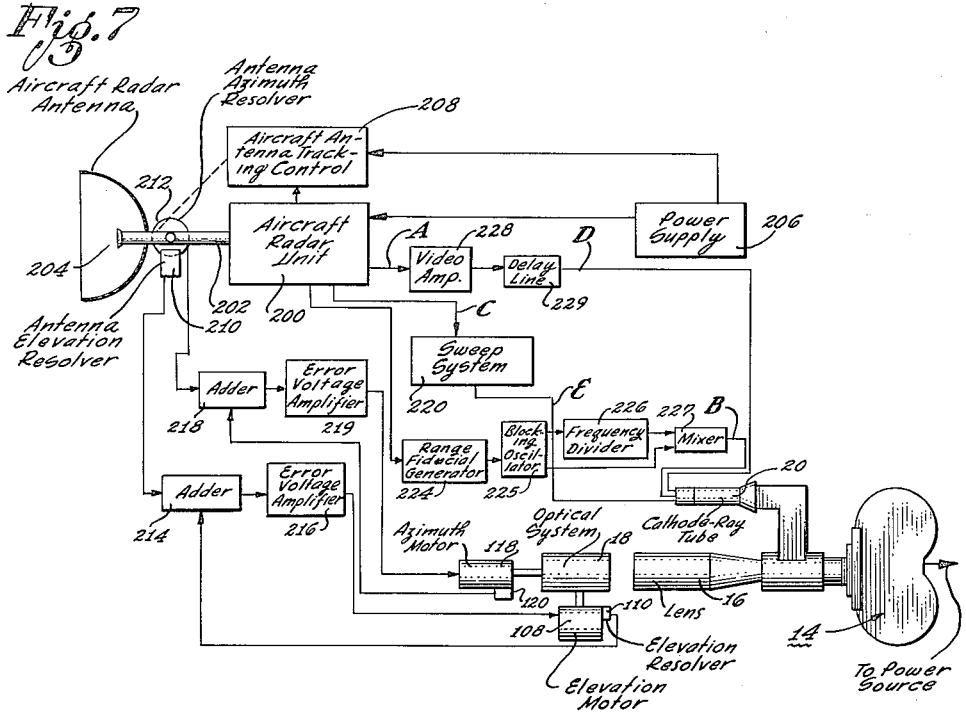
Figure 7 is a schematic diagram, partly in block form, and illustrating various electrical and mechanical components which are used and connected together to constitute one embodiment of the scorer system of the present invention.

An appropriate control system for the motors 108 and 118 is shown in Figure 7. The system of the invention is assumed in Figure 7 to be mounted in an aircraft which is equipped with a usual radar unit 200. The radar unit 200 is coupled through a wave guide 202 to the radar antenna 204 of the aircraft. This antenna is pivoted on a pair of mutually perpendicular axes so that its azimuth and elevational angles can be controlled. The radar unit 200 obtains its exciting electronic voltages from a power supply 206 which is also standard equipment in the aircraft. The unit 200 is coupled to an antenna tracking control unit 208. The control 208 is mechanically coupled to the antenna 204.

The system thus far described is well known and it is believed that a detailed description of the circuits involved is unnecessary. The radar unit 200 is energized to radiate impulses into space by way of the antenna 204. When such impulses are reflected by a target, the radar unit 200 responds to the reflected impulses to cause the control 208 to adjust the azimuth and elevation of the antenna 204, so that the antenna is tracked on the target. This means that within certain limits, the aircraft itself may be maneuvered out of the path of the target, and the target may be maneuvered. However, despite such maneuvering, the antenna 204 is held on the target.

The antenna 204 has a resolver 210 mechanically coupled to it, and this resolver is in the form of an analog computer of known construction which provides an output voltage which is a function of the elevation of the antenna 204. A similar resolver 212 is coupled to the antenna, and this latter resolver develops an output voltage which is a function of the azimuth of the antenna.

The resolver 210 is coupled to a closed servo loop which includes an adder 214 and an error voltage amplifier 216. The resolver 210 and the elevation motor resolver 110 are coupled to the adder 214. This adder has known construction and in known manner compares the output voltages from the resolvers 210 and 110 to produce an error voltage whenever these voltages are not identical. This error voltage is amplified in the amplifier 216 and is used to energize the elevation motor 108. The motor 108 rotates in a direction to cause the resolver 110 to reduce the error voltage. The net result is that the elevation motor is energized until it imparts an elevation to the elevation reflector 102 which corresponds with the elevation of the antenna 204.

In like manner, the resolver 120 associated with the azimuth motor 118 and the azimuth resolver 212 associated with the antenna 204 are coupled to an adder 218. The output terminal of the adder 218 is coupled to an error voltage amplifier 219 which, in turn, is connected to the azimuth motor 118. The azimuth motor is controlled to adjust the azimuth prism 112 so that its azimuth angle corresponds to the azimuth of the antenna 204.

In the manner described above, the azimuth prism 112 and the elevation reflector 102 are slaved to the antenna 204. This slaving is achieved by usual servo mechanisms, such as the one described above. Since servo mechanisms for slaving one instrumentality with another are known to the art, it is believed unnecessary to encumber the present record with a detailed description of this control.

The slaving of the elevation mirror 102 and the azimuth prism 112 with the antenna 204 enables the camera 14 effectively to be maintained trained on the target, despite maneuvering of the aircraft. That is, the optical axis of the camera 14 through the lens 16 is controlled and varied so that the camera is effectively trained on the target area. As noted above, this control of the optical axis of the camera is especially necessary for relatively long firing ranges since it is virtually impossible to maintain the aircraft itself on such a precise course that the target area is held within the field of view of a fixed camera.

It should be noted that the control of the elevation mirror 102 is such that this mirror is tilted at one half the rate of change in the elevation of the antenna 204. This is because the mirror in accordance with known mirror principles produces a double-angle deflection due to the angle of incidence and the angle of departure of the incident light beams.

The radar unit 200 triggers a sweep system 220 in a manner to be described, and the sweep system is coupled to the cathode-ray tube 20. The sweep system 220 is of usual construction to provide the necessary sweep voltages for the cathode-ray tube.

The radar unit 200 is also coupled to a range fiducial generator 224 of known construction. This generator, for example, may be constructed in the manner described on page 2–73 in "Principles of Radar" Masachusetts Institute of Technology, Radar Staff—second edition, published by McGraw Hill—1946.

The range fiducial generator 224 responds to the transmitted pulse from the radar unit 200 to produce a series of accurately spaced pulses which correspond, for example, to two-tenths of a mile of radar range. The fiducial generator 224 is coupled to a blocking oscillator 225, and the blocking oscillator is coupled to a frequency divider 226. The output terminal of the frequency divider 226 and of the blocking oscillator 225 are coupled to a usual mixer 227. The output of the mixer is coupled to the cathode-ray tube 20.

The blocking oscillator may be of any known construction, and it is triggered by the fiducial generator 224 to produce a series of output pulses which correspond respectively to two-tenths of a mile of radar range. The frequency divider 226, also constructed in accordance with known principles and it produces a 5:1 frequency division of the pulses from the blocking oscillator. The frequency divider 226, therefore, produces a series of output pulses corresponding respectively to one mile ranges. The mixer 227, which may be a typical resistor mixer, therefore, produces a series of output pulses, as shown in curve B of Figure 7A, which corresponds to every two-tenths of a mile of radar range. However, every fifth pulse from the mixer corresponds to the merging of a pulse from the frequency divider and a pulse from the blocking oscillator, and such pulses are thereby emphasized to show the even mile ranges.

The radar unit produces a series of pulses, as shown in curve A of Figure 7A, and such pulses are introduced to a video amplifier 228. These pulses correspond to the transmitted pulse which is radiated at a time $t_0$, the reflected pulse from the missile which occurs in a time $t_1$, and the reflected pulse from the target which occurs at a time $t_2$.

The pulses from the video amplifier 228 are delayed in a delay line 229 by a known time interval, and are then applied to the cathode-ray tube 20. The video amplifier and the delay line are of usual construction, and the purpose for the delay is merely to cause the reflected pulses to appear in the vicinity of the center of the screen of the cathode-ray tube 20, rather than to one side.

In usual manner, the radar unit 200 produces a range tracking gate pulse which is illustrated in the curve C of Figure 7A. This gate pulse occurs at a time relating to the $t_2$, and in effect the gate pulse embraces the reflected pulse from the target. The purpose of the gate pulse is to define a time interval corresponding to the reflected target pulse. This gate pulse is used to trigger the sweep system 220, so that the display on the screen of the radar tube 20 corresponds to the immediate vicinity of the target. This is a known technique to enable the representations to be produced on an enlarged scale.

Therefore, the sweep system 220 produces a usual sawtooth wave as shown in the curve E of Figure 7A, and this wave controls the cathode-ray beam in the cathode-ray tube 20 to sweep that beam from one side of the display screen of that tube to the other. The sweep is initiated at such a time that the target reflected pulse appears on the screen, and also the missile reflected pulse appears when the missile comes into the observed area around the target. In the illustrated embodiment, this observed area corresponds to a range of almost two miles. As noted above, the delay line 229 provides that the target and missile indications will appear at the center of the screen.

The pulses from the delay line 229 are used to deflect the beam in one direction to produce the blips illustrated in Figures 9 an 10, and the fiducial range markings from the mixer 227 are used to deflect the beam in the opposite direction to produce the range fiducial indications as shown in those figures.

In the illustrated system, it is always assured that there will be at least one even mile fiducial in the display. The range to the target may be determined by usual radar techniques to the nearest mile. Then, the display will provide range information down to two-tenths of a mile, a suitable correction being made for the delay produced by the delay line 229.

Figure 8:
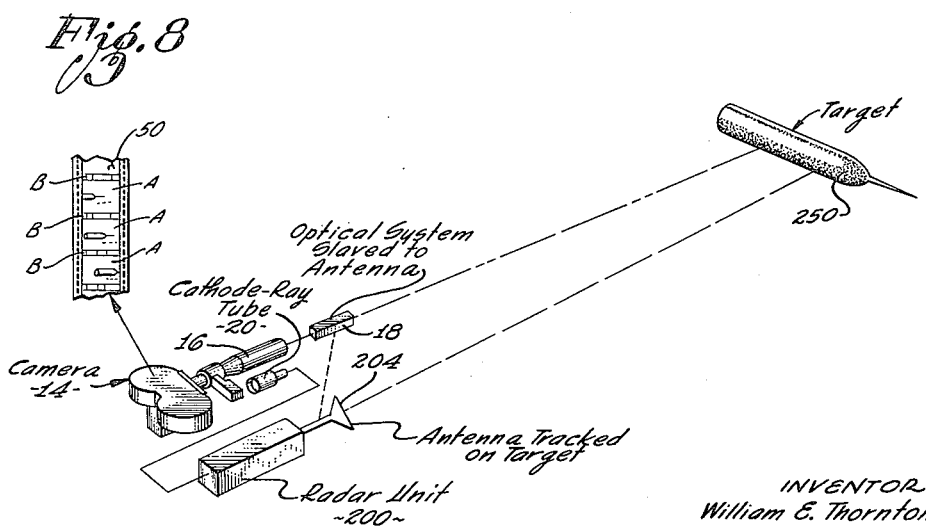
Figure 8 is a schematic showing of a system forming one embodiment of the invention as used in conjunction with an airborne target, this showing being useful in explaining the operation of the invention.

The operation of the system in general may best be explained by reference to Figure 8. The camera 14 and the radar unit 200 are mounted in the attacking aircraft in the described manner. The antenna 204 of the radar unit is tracked on the target 250, and the optical system of the camera is slaved to the antenna 204 so that the camera is effectively maintained trained on the target 250. The target 250 may be of the airborne type such as described previously, and it is towed by a towing aircraft using suitable towing equipment. As noted above, it is merely necessary that the target 250 be optically visible to the camera 14, and that it be radar-reflective.

When the missiles are fired by the attacking aircraft at the target 250, the range between the aircraft and the projectiles increases as the projectiles travel from the aircraft to the target. At the same time, the distance between the attacking aircraft and the target decreases as the aircraft closes with the target. The camera 14 records the optical images of the missiles as they approach and pass the target. These images appear in successive optical image frames A on the film strip 50 in Figure 9. At the same time, the radar unit tracks the missiles and luminous indications of the distances from the aircraft to the missiles and from the aircraft to the target are displayed on the screen 21 of the cathode-ray tube 20.

Images of the luminous indications appearing on the screen 31 of the cathode-ray tube are recorded, as noted above, on the film strip 50 in successive frames B respectively disposed across the top of corresponding ones of the optical image frames A. The frames B extend transversely across the film strip. The lens system 16 is constructed so that the X-axis of the cathode-ray tube screen 31 is represented in the frames B as extending transversely across the film strip, and the Y-axis of the cathode-ray screen is represented as extending longitudinally of the film strip.

As best known in Figure 9, successive ones of the optical image frames A on the film strip 50 photograph the missiles as they are fired by the attacking aircraft so that the camera effectively follows the missiles as they approach and pass the target. Without the radar information, it is impossible to determine from the optical image frames A alone which frame represents the missiles as they actually cross the path of the target. However, by means of the radar images in the corresponding frames B, the particular optical image frame A at which this crossover occurs can be determined.

In successive ones of the frames B of the film strip 50 in Figure 9, the images X represent the radar indications of a missile fired by the attacking aircraft. When a plurality of missiles are fired, it is evident that there will be a plurality of images X in each of the frames B. The images X become increasingly displaced along the X-axis of the screen 31 of the cathode-ray tube 20 for successive ones of the frames B. That is, the images X effectively move from one of the frames B to another along the film strip 50 in a path extending diagonally across the strip from the left hand side to the right hand side of the strip in Figure 9. This path is shown by the dotted line drawn through the "X" images and which is linear for all practical purposes when relatively short intervals are being considered.

Likewise, the images Y in the frames B represent the luminous radar indications on the screen 31 of the cathode-ray tube 20 corresponding to the target 250 as it is moved across the photographed area. The target indications proceed along the X-axis of the cathode-ray tube screen 31 toward the "Y" indications of the missile in the opposite direction. This is because the distance to the target is decreasing because the attacking aircraft is assumed to be approaching the target, whereas the distance to the missiles is increasing as they speed away from the attacking aircraft.

Therefore, the images Y move effectively in a diagonal path from one frame to the next across the film 50 and from its right hand side to its left hand side in Figure 9. This path also is linear for all practical purposes during the short intervals considered, and this path may be represented by the illustrated dashed line that is drawn through the "Y" indications of blips in Figure 9.

The point at which the diagonal path of the "X" indications crosses the diagonal path of the "Y" indications represents the optical image frame at which the distance to the target from the aircraft is the same as the distance to the fired missile. That is, this crossover point represents the instant that the missile crosses the path of the target. This occurs in the optical image frame represented by the arrow in Figure 9. As clearly shown in Figure 9, the images X and Y proceed along their respective diagonal paths from frame to frame, and these images cross in the frame indicated by the arrow. The illustrated positioning of the radar indications with respect to the optical image frames enables the crossover point of the two diagonal paths to be accurately determined, even though some of the radar indications may be lost. That is, it is possible to interpolate the linear diagonal paths of the "X" and "Y" images over a relatively short distance without introducing noticeable errors. It is, therefore, possible to determine the crossover point, even though some of the corresponding radar indications do not appear on the screen of the cathode-ray tube 20 due to interference, noise or the like.

As noted above, the cathode-ray tube 20 is also controlled by the generator 224 so that it exhibits fiducial range markers on its screen. The polarity of the pulses from the generator 224 may be made opposite to those from the unit 200, so that the range markings Z appear on one side of the X-axis on the screen of the cathode-ray tube, and the radar indications X and Y appear on the other side of the X-axis, as shown in Figure 9. As noted, these markings Z correspond, for example, to .2 of a mile and each fifth range marking is emphasized to constitute the mile marker.

The selected optical image frame of the film strip 50 at which the missile crosses the path of the target is shown in Figure 10. It will be remembered that this is the frame indicated by the arrow in Figure 9. As shown in Figure 10, the target image 250 appears in the optical image frame, as does the missile image which shall be designated 251. Also appearing in this frame are the two merged blips X and Y corresponding to the equal radar-indicated distances to the missile and to the target. Also appearing are the fiducial range markings Z, each corresponding to two-tenths of a mile of radar indicated distance. The miss distance components are indicated by the arrows $a$ and $e$.

Scoring is accomplished by scaling the miss distance components $a$ and $e$ shown in the photograph, and by applying appropriate factors as determined by the fiducial range markings Z and by the geometry of the optical system. With a 10-inch lens, for example, one optical image frame width is 475 feet for each mile of range. Therefore, if a miss shown is, for example, 10 percent of a frame width at two and one-half miles range, the actual miss is 119 feet.

More generally $$O_d = \frac{O_L I_d}{F_L}$$

where:

$O_d$—miss distance in feet
$O_L$—target range in feet
$I_d$—image distance in inches between target and missile in frame
$F_L$—focal length in inches of the camera lens The invention provides, therefore, an improved and simplified instrumentality in which radar and optical principles are utilized for determining the characteristics of a body in flight. As described, the system of the invention is particularly applicable to long-range scoring, and it is capable of providing accurate scoring records for such relatively long ranges without the need to precisely maneuver the aircraft so that it is exactly directed on the target area at all times.

Although the now preferred embodiment of the present invention has been shown and described herein, it is to be understood that the invention is not to be limited thereto, for it is susceptible to changes in form and detail within the scope of the appended claims.

I claim:

1. A system for providing three-dimension information of an object in flight, said system including: motion picture camera means for recording optical information concerning two dimensions of the path of the object, such information being recorded in successive optical image frames spaced along a film strip, first pivotable beam-shifting means disposed in the optical path between the object and said camera, second beam-shifting means disposed in said optical path and pivotable about an axis which is angularly disposed with respect to the pivot axis of said first beam-shifting means, said first and second beam-shifting means serving to control the direction of the optical path of said camera, control means for said first and second beam-shifting means for controlling the respective angular positions thereof to maintain said camera effectively trained on the object, radar means for producing information concerning the third dimension of the path of the object, said radar means including a display tube having a screen on which such radar information appears, and a lens system for projecting images from said screen onto the film strip to be recorded in successive transverse frames on such strip between successive ones of the optical image frames.

2. A system for providing three-dimensional information of an object in flight, said system including: motion picture camera means for recording optical information concerning two dimensions of the path of the object, such information being recorded in successive optical image frames spaced along a film strip, a first pivotable reflector disposed in the optical path between said object and said camera, a second pivotable reflector disposed in said optical path axially spaced from said first reflector and pivotable about an axis perpendicular to the pivot axis of said first reflector, said first and second reflectors serving to control the direction of the optical axis of said camera, control means for said first and second reflectors for controlling the respective angular positions thereof to maintain said camera effectively trained on the object, radar means for producing information concerning the third dimension of the path of the object, said radar means including a display tube having a screen on which such radar information appears, and a lens system for projecting images from said screen onto the film strip to be recorded in successive transverse frames on such strip between successive ones of the optical image frames.

3. A system adapted to be mounted in an aircraft for providing three-dimensional information of an object in flight, such aircraft including a pivotable antenna and radar means for tracking said antenna on the object, said system including: motion picture camera means for recording optical information concerning two dimensions of the path of the object, such information being recorded in successive optical image frames spaced along a film strip, first pivotable beam-shifting means disposed in the optical path between the object and said camera, second beam-shifting means disposed in said optical path and pivotable about an axis angularly disposed to the pivot axis of said first beam-shifting means, said first and second beam-shifting means serving to enable said camera to be effectively trained on the object in flight, servo control means for coupling said first and second beam-shifting means to the antenna included in the aircraft so as to slave said first and second beam-shifting means to the antenna, means for producing radar information concerning the third dimension of the path of the object and including a display tube having a screen on which such information appears, and a lens system for projecting images from said screen onto the film strip to be recorded successive transverse frames on such strip between successive ones of the first-mentioned optical image frames.

4. A system for providing three-dimensional information of an object in flight, said system including: a pivotable antenna, radar means, control means coupled to said radar means for tracking said antenna on the object, motion picture camera means for recording optical information concerning two dimensions of the path of the object, such information being recorded in successive optical image frames spaced along a film strip, first pivotable beam-shifting means disposed in the optical path between the object and said camera, second beam-shifting means disposed in said optical path and pivotable about an axis angularly disposed to the pivot axis of said first beam-shifting means, said first and second beam-shifting means serving to enable said camera to be effectively trained on the object in flight, servo control means for coupling said first and second beam-shifting means to said antenna to slave said first and second beam-shifting means to said antenna, means coupled to said radar means for producing information concerning the third dimension of the path of the object and including a display tube having a screen on which such information appears, and a lens system for projecting images from said screen onto the film strip to be recorded in successive transverse frames on such strip between successive ones of the optical image frames.

5. A system for providing three-dimension information of an object in flight, said system including: a pivotable antenna, first and second resolving means coupled to said antenna for providing a pair of signals respectively indicating the azimuth and elevation of said antenna, radar means, control means coupled to said radar means for tracking said antenna on the object, motion picture camera means for recording optical information concerning two dimensions of the path of the object, such information being recorded in successive optical image frames spaced along a film strip, first pivotable beam-shifting means disposed in the optical path between the object and said camera, second beam-shifting means disposed in said optical path and pivotable about an axis perpendicular to the pivot axis of said first beam-shifting means, third and fourth resolving means respectively coupled to said first and second beam-shifting means for generating individual signals indicative of the respective angular positions of said beam-shifting means, first and second drive mechanisms for said first and second beam-shifting means, said first and second beam-shifting means serving to enable said camera to be effectively trained on the object in flight, control means coupling said first and third resolving means to said first drive mechanism and coupling said second and fourth resolving means to said second drive mechanism to slave said first and second beam-shifting means to said antenna, means coupled to said radar means for producing information concerning the third dimension of the path of the object and including a display tube having a screen on which such information appears, and a lens system for projecting images from said screen onto the film strip to be recorded in successive transverse frames on said strip between successive ones of the optical image frames.

6. In a system adapted to be supported in an aircraft and the like for producing three-dimensional information of an object in flight and which includes: motion picture camera means for producing information concerning two dimensions of the path of the object, radar means for producing information concerning the third dimension of the path of the object, and means for correlating the information from said radar means with the information in said camera means; the combination of means pivotable with respect to the aircraft for controlling the direction of the optical path of the camera, and radar control means for said pivotable means for maintaining the camera effectively trained on the object.

7. In a system adapted to be supported in an aircraft and the like for producing three-dimension information of an object in flight and which includes: motion picture camera means for recording optical information concerning two dimensions of the path of the object, said information being recorded in successive optical image frames spaced along a film strip, radar means for producing information concerning the third dimension of the path of the object and including a display tube having a screen on which such information appears, and a lens system for projecting images from said screen onto the film strip to be recorded in successive transverse frames on such strip between successive ones of the optical image frames; the combination of means pivotable with respect to the aircraft for controlling the direction of the optical path of the camera, and radar-actuated control means for said pivotable means for maintaining the camera effectively trained on the object.

8. In a system adapted to be supported in an aircraft and the like for producing three-dimensional information of an object in flight and which includes, motion picture camera means for recording optical information concerning two dimensions of the path of the object, such information being recorded in successive optical image frames spaced along a film strip, radar means for producing information concerning the third dimension of the path of the object and including a display tube having a screen on which such information appears, and a lens system for projecting images from said screen onto the film strip to be recorded in successive transverse frames on said strip between successive ones of the optical image frames; the combination of first pivotable beam-shifting means disposed in the optical path between the object and said camera, second beam-shifting means disposed in said optical path and pivotable about an axis disposed at right angles to the pivot axis of said first beam-shifting means, said first and second beam-shifting means serving to control the direction of the optical axis of said camera, and radar-actuated control means for said first and second beam-shifting means for controlling the angular position thereof so as to maintain said camera effectively trained on the object.

9. A system for measuring the miss-distance between a target and a projectile fired at the target from a firing point, said system including: motion picture camera means for producing information concerning two dimensions of the path of the target and of the path of the projectile, pivotable means for effectively training the camera on the target, radar means for producing information concerning the third dimension of the path of the target and of the projectile, antenna means connected to the radar means, means coupled to the radar means for tracking the antenna means with respect to the target, means coupled to the antenna means for slaving the pivotable means with the antenna means and means for correlating information from the radar means with the information of the camera means to determine when the range of the target from the firing point bears a particular relationship with the range of the projectile from the firing point.

10. A system for measuring the miss-distance between a target and a projectile fired at the target from a firing point, said system including: motion picture camera means for recording optical images of the target and of the projectile to provide information concerning two dimensions of the path of the target and of the path of the projectile, pivotable means for effectively training the camera on the target, radar means for producing information concerning the third dimension of the path of the target and of the path of the projectile and including a cathode ray tube on which indications corresponding to such radar information appear, antenna means connected to the radar means, means coupled to the radar means for tracking the antenna means with respect to the target, means coupled to the antenna means for slaving the pivotable means with the antenna means, means for recording at least one image of the radar indications on the film strip in correlation with at least one of said optical images thereon, means for producing range fiducial signals, means for introducing the range fiducial signals to the cathode ray tube to obtain range fiducial markings in response thereto, and means for recording at least one image of the range fiducial markings on the film strip in correlation with at least one of the optical images on the strip.

11. A system for measuring the miss-distance between a target and a projectile fired at the target from a firing point, said system including: motion picture camera means for recording optical images of the target and of the projectile to provide information concerning two dimensions of the path of the target and of the path of the projectile, radar means for producing information concerning the third dimension of the path of the target and of the projectile and including a cathode ray tube on which indications corresponding to such radar information appear, antenna means connected to the radar means, means coupled to the radar means for tracking the antenna means with respect to the target, means coupled to the antenna means for slaving the pivotable means with the antenna means, means for recording at least one image of the radar indications on the film strip in correlation with at least one of said optical images, means for producing range fiducial signals, means for introducing the range fiducial signals to the cathode ray tube to obtain range fiducial markings in response thereto, and means for recording at least one image of the range fiducial markings on the film strip in correlation with at least one of the optical images on the strip.

12. A system for measuring the miss-distance between a target and a projectile fired at the target from a firing point, said system including: motion picture camera means, pivotable means for effectively training the camera on the target to record in successive frames on a film strip optical images showing the movements on the target and of the projectile as seen from the firing point, radar means located at the firing point and including a cathode-ray indicating tube, antenna means coupled to the radar means, means for positioning the antenna means to direct signals from the radar means at the flight path of the projectile and at the target and to receive echo signals from the projectile and from the target, means for introducing such signals to the cathode-ray indicating tube to obtain radar indications in response thereto, means for recording at least one image of the radar indications on the film strip in correlation with at least one of the optical images on the film strip so as to identify the optical image frame on the film strip which indicates the distance between the target and the projectile as the projectile crosses the path of the target, means for tracking the antenna means on the target, and means for coupling the antenna means to the pivotable means to slave the pivotable means to the antenna means.

13. The combination defined in claim 12 and which includes means for producing range fiducial signals, means for introducing the range fiducial signals with the cathode-ray tube to obtain range fiducial markings in response thereto, and means for recording at least one image of the range fiducial markings on the film strip in correlation with at least one of the optical images on the film strip to indicate the range from the firing point of the object represented by such optical image.

14. A system for measuring the miss-distance between a target and a projectile fired at the target from a firing point, said system including: motion picture camera means for producing information concerning two dimensions of the path of the target and of the path of the projectile, lens means for controlling the direction of the optical path of the camera to effectively train the camera on the target, radar means for producing information concerning the range of the target and of the projectile with respect to the firing point, means coupled to the radar means for controlling the lens means to cause the camera effectively to be tracked on the target, and means for collating information from the radar means with the information from the camera means to determine when the information from the camera means coincides with radar information indicating when the range of the target from the firing point bears a particular relationship with the range of the projectile from the firing point.

15. A system for measuring the miss-distance between a target and a projectile fired at the target from a firing point, said system including: motion picture camera means for producing information concerning two dimensions of the path of the target and of the path of the projectile, pivotable lens means for controlling the direction of the optical path of the camera to effectively train the camera on the target, radar means for producing information concerning the range of the target from the firing point and the range of the projectile from the firing point, pivotable antenna means coupled to the radar means, means coupled to the radar means for controlling the antenna means to cause the same effectively to be tracked on the target, means coupled to the antenna means for controlling the lens means to cause the lens means to be slaved to the antenna means, and means for correlating information from the radar means with information from the camera means to indicate when the information on the camera means coincides to the point at which the range of the target from the firing point is equal to the range of the projectile from the firing point.

16. Apparatus for indicating the distance between a target and a projectile fired at the target from a firing point, said system including: recording means for providing a record of the positions of the target and the projectile relative to the firing point where the record is in a form capable of producing a visual indication; means for mounting the recording means at the firing point; positioning means coupled to the recording means for obtaining a variation in the direction in which the recording means is pointed; signal means including energy-responsive means at the firing point for producing signals in accordance with the distances of the target and the projectile from the firing point and for maintaining the energy-responsive means directed at the target; means coupled to the signal means for converting the signals from the signal means to indications capable of being recorded in a form corresponding to the recording of the positions of the target and the projectile relative to the firing point; control means responsive to the positioning of the energy-responsive means and coupled to the positioning means for adjusting the positioning means to maintain the recording means pointed at the target; and means responsive to the indications from the converting means and coupled to the recording means for introducing such indications to the recording means for the recording of such indications concurrently with the recording of the positions of the target and the projectile relative to the firing point.

17. Apparatus for indicating the distance between a target and a projectile fired at the target from a firing point, said system including: means at the firing point for providing a record of the angular separation between the target and the projectile relative to the firing point at successive instants of time where the record is in a form adapted to produce a visual indication; energy-responsive means at the firing point for transmitting and receiving signals; means coupled to the energy-responsive means for introducing energy to the energy-responsive means for the radiation of such energy by the energy-responsive means toward the projectile and the target and for the reception by the energy-responsive means from the target of the first energy related to the radiated energy and for the reception by the energy-responsive means from the projectile of second energy related to the radiated energy and for obtaining the detection of such first received energy and such second received energy and for maintaining the energy-responsive means pointed at the target; means responsive to the first detected energy and to the second detected energy for respectively converting such detected energy to first and second indications capable of being recorded by the recording means in a form corresponding to the recording of the angular separation between the target and the projectile relative to the firing point; means coupled to the recording means and responsive to the indications from the last mentioned means for introducing such indications to the recording means for the recording of such indications at the successive instants of time; and means responsive to the positioning of the energy-responsive means and coupled to the recording mean for varying the positioning of the recording means in accordance with the positioning of the energy-responsive means.

18. Apparatus for indicating the distance between a target and a projectile fired at the target from a firing point, said system including: recording means at the firing point for providing a record of the positions of the target and the projectile relative to the firing point where the record is in a form capable of producing a visual indication; means including energy-responsive means at the firing point for receiving signals from the target and the projectile in accordance with the distances of the target and the projectile from the firing point and for detecting such signals; means coupled to the energy-responsive means for obtaining a tracking of the energy-responsive means on the target to maintain a continued reception of signals from the target by the energy-responsive means and a continued detection of such signals by the energy-responsive means; means responsive to the signals from the tracking means for converting such signals to indications capable of being recorded by the recording means in a form corresponding to the record of the positions of the target and the projectile relative to the firing point; means responsive to the indications from the converting means for introducing such signals indications to the recording means for the recording of such indications concurrently with the recording of the positions of the target and the projectile relative to the firing point; and servo means responsive to the position of the energy-responsive means and coupled to the recording means for obtaiinng a tracking of the target by the recording means in accordance with variations in the disposition of the energy-responsive means.

References Cited in the file of this patent

UNITED STATES PATENTS

| | | |
|---|---|---|
| 2,572,014 | De Rosa | Oct. 23, 1951 |
| 2,590,956 | Gille | Apr. 1, 1952 |
| 2,705,319 | Dauber et al. | Mar. 29, 1955 |
| 2,766,668 | Harry et al. | Oct. 16, 1956 |
| 2,773,732 | Roberts et al. | Dec. 11, 1956 |
| 2,832,953 | Tasker et al. | Apr. 29, 1958 |